Aug. 9, 1938.                W. S. SAUNDERS ET AL                2,126,143
                           ADJUSTABLE SUPPORTING MEANS
                              Filed Nov. 3, 1937          2 Sheets-Sheet 1
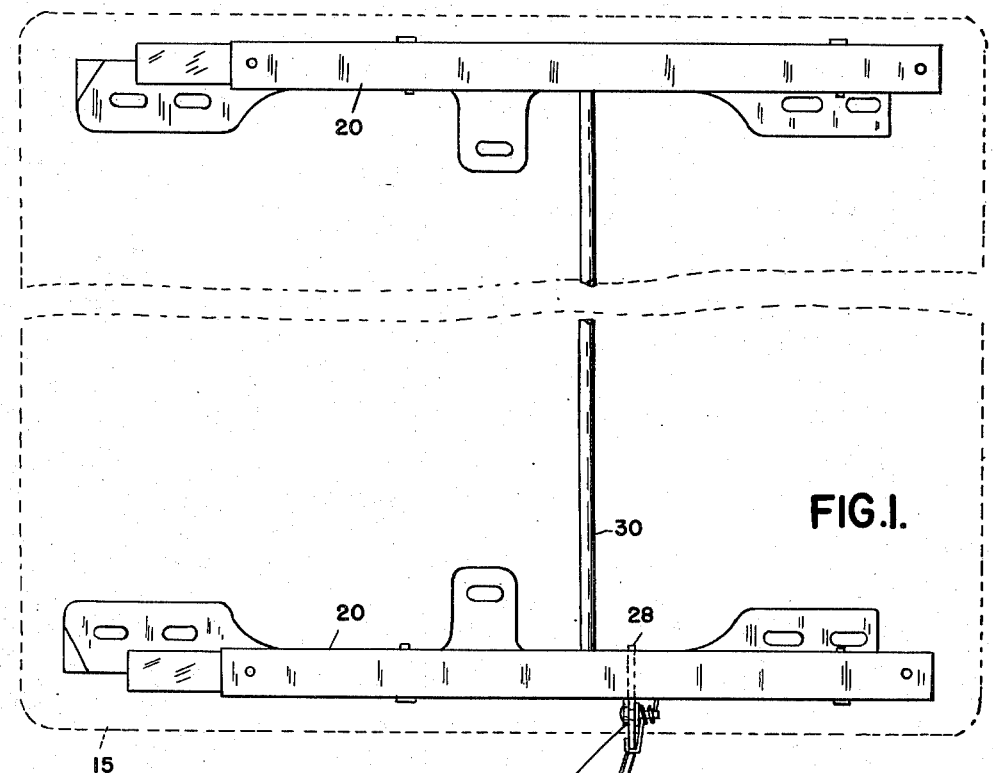
FIG.I.
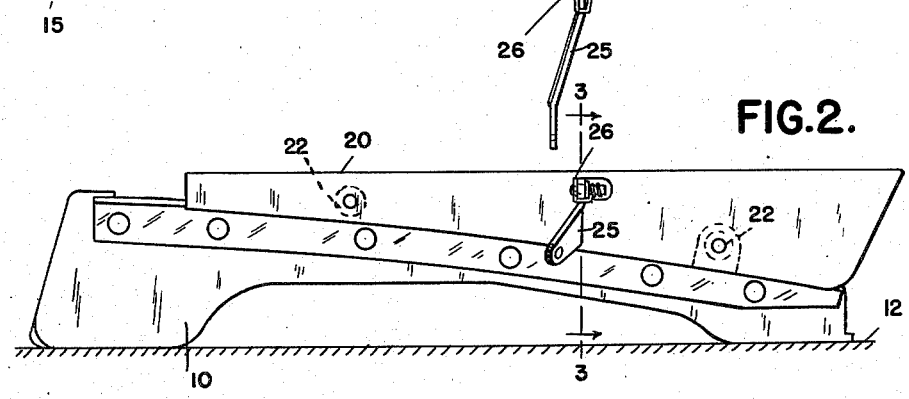
FIG.2.
INVENTORS
WALTER S. SAUNDERS
BY THOMAS A. McGREGOR
ATTORNEYS Aug. 9, 1938.   W. S. SAUNDERS ET AL   2,126,143
ADJUSTABLE SUPPORTING MEANS
Filed Nov. 3, 1937   2 Sheets-Sheet 2
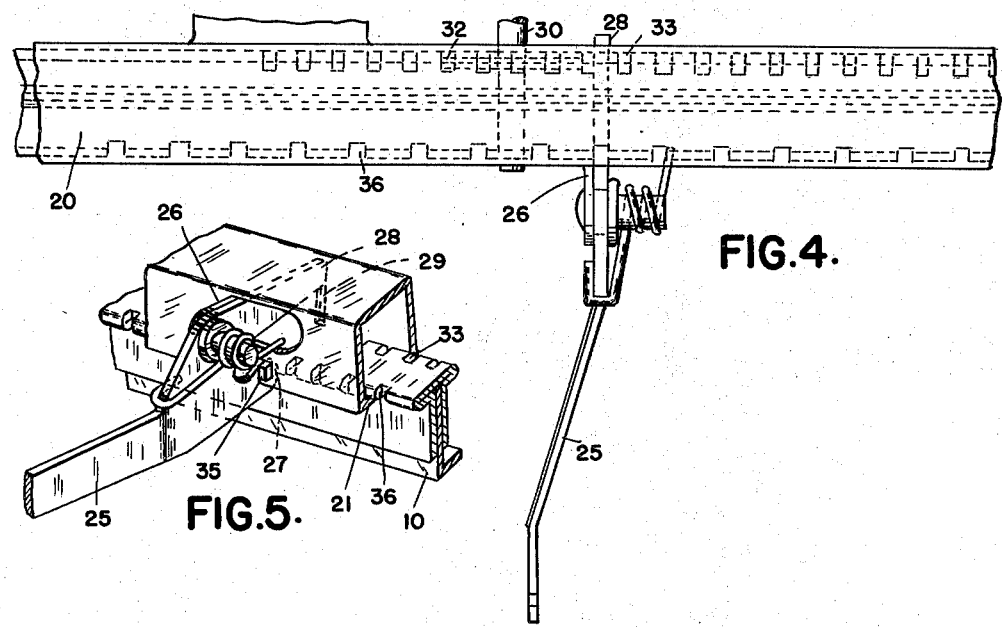
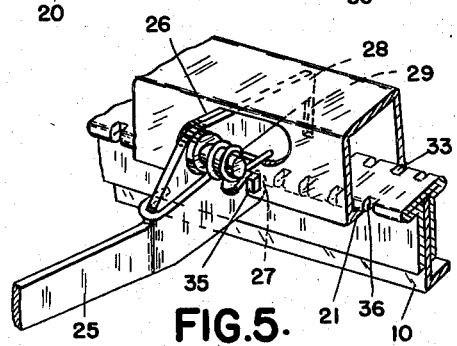
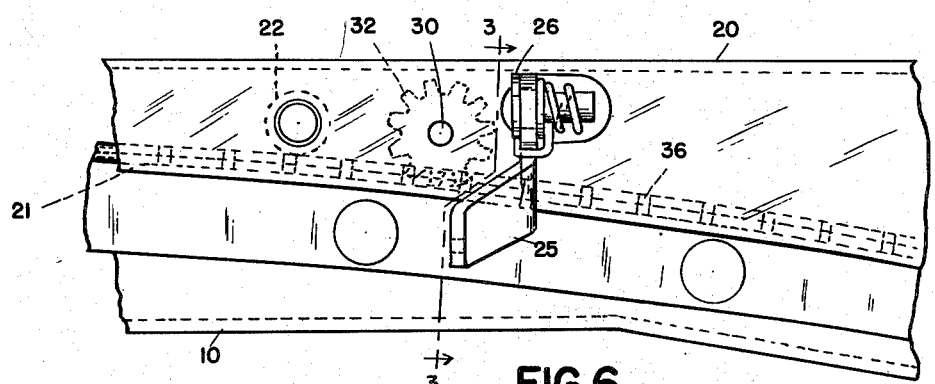
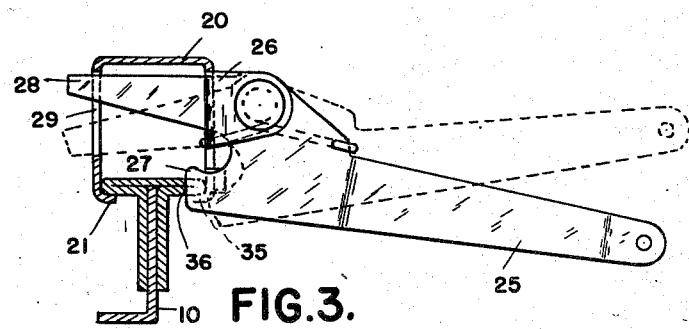
INVENTORS
WALTER S. SAUNDERS
BY THOMAS A. McGREGOR
ATTORNEYS Patented Aug. 9, 1938

2,126,143

UNITED STATES PATENT OFFICE 2,126,143

ADJUSTABLE SUPPORTING MEANS

Walter S. Saunders and Thomas A. McGregor, Pontiac, Mich., assignors to The American Forging & Socket Company, Pontiac, Mich., a corporation of Michigan Application November 3, 1937, Serial No. 172,592

5 Claims. (Cl. 155—14)

This invention relates to adjustable supporting means for vehicle seats and the like, and aims to provide an improved construction whereby such a seat may be easily moved to any of various positions, yet is normally rigidly held against movement.

An important object of the invention comprises improvement of the locking means by which the seat is normally held against movement, and provision of extremely rugged yet simple and inexpensive locking means whose principal structural element consists of a simple sheet metal detent, so constructed and arranged with respect to the seat-supporting mechanism as to prevent injury to either the supporting or the locking mechanism in event unduly severe forces are applied thereto by the operator during actuation thereof, or the mechanism is subjected to other abuse.

Other objects and advantages will be apparent from the following description, wherein reference is made to the accompanying drawings illustrating a preferred embodiment of our invention and wherein similar reference numerals designate similar parts throughout the several views.

In the drawings:

Figure 1 is a plan view showing a seat supporting assembly incorporating the present invention.

Figure 2 is a side elevational view thereof showing the locking means.

Figure 3 is a vertical section taken substantially on the line 3—3 of Figure 6 and looking in the direction of the arrows.

Figure 4 is a large scale detail plan view showing the locking mechanism.

Figure 5 is a fragmentary perspective view of the locking means and adjacent track and carriage portions, and Figure 6 is an enlarged fragmentary side elevational view of the assembly, showing the locking portions.

Referring now to the drawings, reference character 10 designates supporting track portions, one of which is secured to the floor 12 beneath and near each end of the seat 15. The seat is mounted upon the carriage portions 20, one carriage being supported and rollable upon each track member 10. The two track and carriage assemblies are alike, except that the locking means is incorporated in one only. The detailed description may accordingly be confined to the assembly incorporating the locking means.

The track member will be seen to be T-shaped in cross section. The box-like carriage is inverted thereover and provided with under-bent flange portions 21 underhanging the head of the track to prevent separation of the carriage therefrom. Rollers 22 are journaled in the carriage and travel along the flange of the track to provide anti-friction support for the carriage. The two carriages are interconnected, to synchronize their movement, by means of a cross-shaft 30 journaled at its ends in each of the carriage members and having fixed thereupon within each carriage member a gear 32 meshing with rack teeth, formed as a series of slots 33, cut in the inner edge of the top flange of each track.

The locking means, provided for one only of the track and carriage assemblies, comprises a lever 25 projecting at right angles and horizontally from the carriage by which it is carried, pivoted to an ear 26 turned outwardly from the body of the carriage. An integral under-hooked portion 27 of the lever constitutes a detent, projecting through a slot 35 in the carriage and being movable, upon swinging of the lever, into and out of engagement with any one of a plurality of slots 36, cut in the outer edge of the top flange of the track. An inward extension 28 of the lever projects through the inner web of the carriage, traveling in a vertical slot 29 in such web. Arm 28 provides a positive stop, limiting swing movement of the lever, and distributing between the two side webs of the carriage the stress which arises when one attempts to force the lever either upwardly or downwardly beyond its intended limits. Any such force which strains the carriage sufficiently to actually rock it slightly about a longitudinal axis, is promptly resisted by engagement of one of the flanges 21 with the under side of the head of the track, while the strength of these parts and of the extension stop portion 28 of the lever prevents injuring the device by such abuse.

While it will be apparent that the illustrated embodiment of our invention herein disclosed is well calculated to adequately fulfill the objects and advantages primarily stated, it is to be understood that the invention is susceptible to variation, modification and change within the spirit and scope of the subjoined claims.

What we claim is:

1. Supporting means for a seat or the like, comprising a track having a transverse head portion, a carriage rollable along the track and having spaced side webs, guiding portions carried by the carriage, projecting beneath the transverse head of the track in position to limit rocking of the carriage with respect to the track, and detent means for releasably holding the carriage against rolling along the track, said detent means comprising a lever pivotally supported by the carriage for swinging movement in a vertical plane transverse to the track and carriage assembly, said detent having a part extending through both side webs of the carriage and engageable at the limit of its movement with one of said webs.

2. Means as set forth in claim 1 in which said lever is pivotally supported on one of said side webs and extends through a slot in the other, said slot limiting its pivotal movement.

3. Means as set forth in claim 1 in which said lever is pivoted upon one of said side webs and extends outwardly therefrom, a portion of said lever extending from the other side of its pivotal support freely through the web to which it is pivoted and traveling in a slot in the other web which limits pivotal movement of the lever at both extremes.

4. Means as set forth in claim 1 in which said lever is pivoted upon one of said side webs and extends freely through the same and through a slot in the other of said side webs, said slot limiting pivotal movement of the lever, said lever having another portion extending through the first mentioned side web and into and out of holding engagement with the track.

5. Means as set forth in claim 1 in which said lever is pivoted upon one of said side webs and extends through the same and through a slot in the other of said side webs, said slot limiting pivotal movement of the lever, said lever having another portion extending through a slot in the first mentioned side web and engageable and disengageable with the track, the last mentioned slot substantially conforming in width to the thickness of the lever and bracing the same against lateral distortion.

WALTER S. SAUNDERS.
THOMAS A. McGREGOR.